Oct. 8, 1940.   E. HEINECKE   2,217,408
SUPPRESSING PARASITIC OSCILLATIONS IN HIGH FREQUENCY ARRANGEMENTS
Filed Dec. 13, 1938

Inventor:
Erich Heinecke
by E. D. Phinney
Att'y

Patented Oct. 8, 1940

2,217,408

UNITED STATES PATENT OFFICE 2,217,408

SUPPRESSING PARASITIC OSCILLATIONS IN HIGH FREQUENCY ARRANGEMENTS

Erich Heinecke, Berlin, Germany, assignor to C. Lorenz Aktiengesellschaft, Berlin-Tempelhof, Germany, a company Application December 13, 1938, Serial No. 245,344
In Germany December 10, 1937

1 Claim. (Cl. 179—171)

The operation of high frequency transmitters is often disturbed by undesired oscillations which arise through self-excitation, the customary neutralizing methods, such as grid or anode neutralisation, failing to suppress these oscillations.

The invention consists in certain features of novelty which will appear from the following description and be particularly pointed out in the appended claim, reference being had to the accompanying drawing in which—

Figure 1:
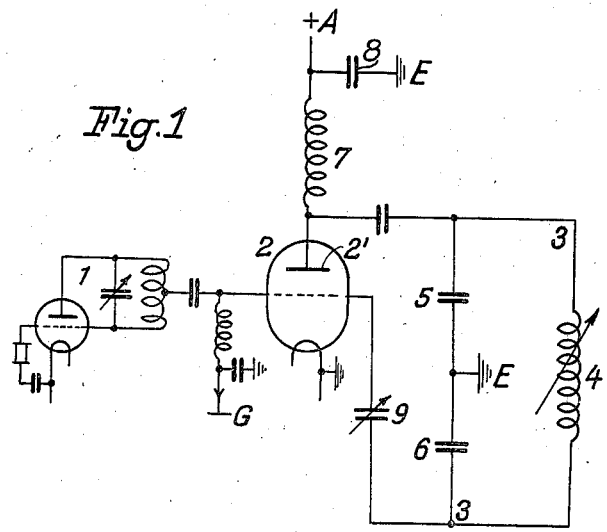
Figure 2:
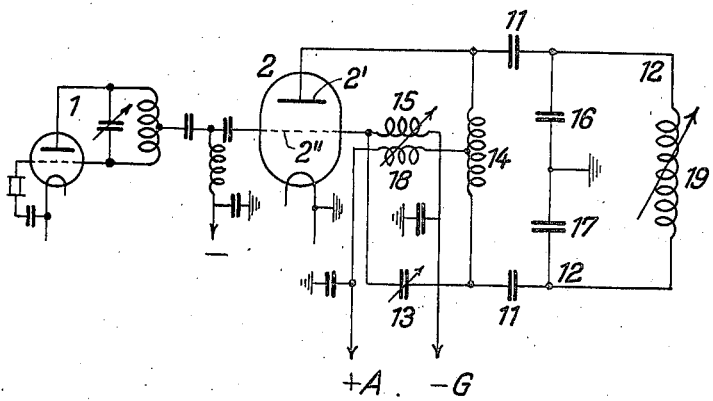

Fig. 1 is a diagram of a known arrangement and serves to explain the origination of undesired oscillations, Fig. 2 is a diagram representing one embodiment of the invention.

The arrangement shown in Fig. 1 is a high-frequency power amplifying stage which is controlled by an electron tube stage 1 and comprises an electronic tube 2 whose anode 2' is connected with an oscillatory circuit 3. This circuit contains a variable inductance 4 and two condensers 5, 6 earthed in the middle between them. In order to avoid self-excitation effected on the operating wave of circuit 3, the arrangement is stabilized over a condenser 9 after the manner of anode neutralisation. The feeding voltage +A is supplied to anode 2' over a choke 7 grounded at E through a condenser 8. An arrangement of this kind, however, is not stable in the case of oscillations originating in the circuit that comprises choke 7, earth E and condenser 5, and which may be considered also to include condenser 6 connected in parallel with condenser 5 over inductance 4. As regards this oscillatory circuit, condenser 9, intended as a neutralizing means in relation to the useful oscillations, does not act to stabilize it, but acts as an additional back-coupling, since this condenser is in a sense connected in parallel with the grid-anode capacity. If there are in the grid circuit of the tube 2 certain reactances, such as circuits comprising the grid choke and capacities, then disturbing oscillations will arise.

In accordance with the invention these oscillations are prevented from originating. This is attained by means of a negative back-coupling which is effective with respect to the oscillatory circuit producing them, but does not entail an additional feed-back as regards the operating wave.

In the embodiment of the invention shown in Fig. 2 by way of example 1 again denotes a stage for controlling an output or power stage that comprises an electronic tube 2 to whose anode 2' an oscillatory circuit 12 is joined. The inter-electrode capacity anode-grid is neutralized by a condenser 13. The anode voltage +A is supplied over a choke 18 to the so-called symmetrizing choke 14 connected in parallel with the circuit of useful oscillations 12. The point in which choke 18 is connected with choke 14 is so chosen that in relation to the useful oscillations of the circuit 12 there shall be no potential with respect to earth. 11 denotes condensers which are pure blocking condensers offering no resistance to high frequency currents.

In accordance with the invention a choke 15 connected to the grid 2" of tube 2 is so coupled to the choke 18 as to provide a negative feedback connection for an alternating current flowing through choke 18. The current necessary for insuring such negative back-coupling will in fact flow through choke 18, because the point in which the chokes 14, 18 are interconnected is in relation to the aforesaid disturbing oscillations possessed of a potential with respect to earth. In this connection, regarding such disturbing oscillations condensers 16, 17 should be considered to be connected in parallel while condenser 13 is connected in parallel with the inter-electrode capacity of tube 2.

As regards the useful oscillations of circuit 12, however, there is no potential with respect to earth so that both the control action influencing tube 2 and the neutralisation of circuit 12 will in no wise be affected.

The invention is not restricted to apparatus of the kind here shown, but may be employed also in push-pull connected arrangements. The arrangement may also be such that the anode voltage is supplied to tube 2 over choke 18 and the inductance 19 of circuit 12, the point in which these coils 18, 19 are interconnected then being the symmetrizing point which in a sense is equivalent to the point in which the chokes 14, 18 are interconnected.

Devices as provided by the invention are applicable also to circuit arrangements of the kind operating with grid neutralisation.

What is claimed is:

A high frequency amplifier circuit comprising an electron tube, a tuned output circuit connected to the anode of said tube, a neutralizing connection from a point in said tuned circuit to the grid of said tube, a first choke connected between the said neutralizing connection and the anode of said tube, means for supplying the anode voltage to said tube including a second choke connected to a point of said first choke which has no potential to ground with respect to the oscillations of said tuned circuit and means for back coupling said second choke to the grid of said tube to suppress parasitic oscillations in said amplifier circuit.

ERICH HEINECKE.